US007317952B2

(12) United States Patent
Bhandiwad et al.

(10) Patent No.: US 7,317,952 B2
(45) Date of Patent: Jan. 8, 2008

(54) MANAGING FIELD DEVICES HAVING DIFFERENT DEVICE DESCRIPTION SPECIFICATIONS IN A PROCESS CONTROL SYSTEM

(75) Inventors: Deepak S Bhandiwad, Bangalore (IN); Rizwan Mohammed, Bangalore (IN); Raghavendra TS Prasad, Bangalore (IN); Surjya Narayana Patra, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/157,234

(22) Filed: Jun. 20, 2005

(65) Prior Publication Data

US 2006/0229738 A1 Oct. 12, 2006

(30) Foreign Application Priority Data

Apr. 7, 2005 (IN) .......................... 391/CHE/2005

(51) Int. Cl.
*G05B 11/01* (2006.01)
*G05B 19/18* (2006.01)
*G05B 15/00* (2006.01)
*G06F 15/16* (2006.01)

(52) U.S. Cl. .......................... 700/17; 700/65; 700/83; 709/201; 709/202; 709/203

(58) Field of Classification Search ........ 709/201–203, 709/219; 700/17, 65, 83
See application file for complete search history.

(56) References Cited

U.S. PATENT DOCUMENTS

| 6,925,335 | B2* | 8/2005 | May et al. ...................... 700/9 |
|---|---|---|---|
| 6,944,555 | B2* | 9/2005 | Blackett et al. ................ 702/62 |
| 7,054,922 | B2* | 5/2006 | Kinney et al. .............. 709/219 |
| 2002/0069275 | A1 | 6/2002 | Tindal |
| 2002/0080938 | A1* | 6/2002 | Alexander et al. ...... 379/106.01 |
| 2003/0009313 | A1* | 1/2003 | May et al. ................... 702/188 |
| 2003/0014500 | A1 | 1/2003 | Schleiss et al. |
| 2004/0078457 | A1 | 4/2004 | Tindal |
| 2004/0167750 | A1 | 8/2004 | Pagnano et al. |
| 2004/0230582 | A1 | 11/2004 | Pagnano et al. |
| 2004/0230899 | A1* | 11/2004 | Pagnano et al. ............. 715/513 |
| 2004/0255017 | A1* | 12/2004 | Jurisch et al. ............... 709/223 |
| 2005/0155043 | A1* | 7/2005 | Schulz et al. ................ 719/328 |
| 2005/0192678 | A1* | 9/2005 | May et al. ....................... 700/9 |

FOREIGN PATENT DOCUMENTS

| EP | 1355136 B1 | 10/2003 |
|---|---|---|
| EP | 1376281 A1 | 1/2004 |
| WO | WO 01/96994 A2 | 12/2001 |
| WO | WO 03/029907 A1 | 4/2003 |

* cited by examiner

Primary Examiner—Ronald Hartman, Jr.
(74) Attorney, Agent, or Firm—Naren Thappeta

(57) ABSTRACT

According to an aspect of the present invention, device descriptions specified using different device description (DD) specifications are converted (represented) into a single format. In an embodiment, the single format corresponds to extended markup language (XML). The device description in the single format is then examined to provide a user interface for management of the corresponding field devices. Due to such use of a common format, integration of field devices (into a management system) having device description defined according to a new device description specification, may be simplified.

18 Claims, 13 Drawing Sheets

```
501A   IMPORT STANDARD _MENU, DEVICE_REVISION 1, DD_REVISION 1
502A   {
503A      MENU root_menu;
504A      REDEFINITIONS
505A      {
506A        MENU root_menu
507A        {
508A           REDEFINE LABEL "Online";
509A           REDEFINE ITEMS
510A           {
511A              Patent,
512A              pos_serial_number
513A           }
514A        }
515A      }
516A   }
517A
518A      MENU Patent
519A      {
520A         LABEL "PatentTest";
521A         ITEMS
522A         {
523A            menu_test1,
524A            menu_test2,
525A            menu_test3,
526A            menu_test4
527A         }
528A      }
529A
530A      MENU menu_test1
531A      {
532A         LABEL
533A            IF (pos_serial_number == 1)
534A            {
535A               "MENU1";
536A            }
537A            ELSE
538A            {
539A               "Menu not available";
540A            }
541A
542A         ITEMS
543A         {
544A            pos_value
545A         }
546A      }
```

FIG. 5A

```
501B    MENU menu_test2
502B    {
503B        LABEL
504B            IF (pos_serial_number == 1)
505B            {
506B                "MENU2";
507B            }
508B            ELSE
509B            {
510B                "Menu not available";
511B            }
512B        ITEMS
513B        {
514B            pos_value
515B        }
516B    }
517B
518B    MENU menu_test3
519B    {
520B        LABEL
521B            IF (pos_serial_number == 2)
522B            {
523B                "MENU3";
524B            }
525B            ELSE
526B            {
527B                "Menu not available";
528B            }
529B        ITEMS
530B        {
531B            pos_value
532B        }
533B    }
534B
535B    MENU menu_test4
536B    {
537B        LABEL
538B            IF (pos_serial_number == 2)
539B            {
540B                "MENU4";
541B            }
542B            ELSE
543B            {
544B                "Menu not available";
545B            }
546B        ITEMS
547B        {
548B            pos_value
549B        }
550B    }
```

*FIG. 5B*

```
501C  VARIABLE private_label_distributor
502C  {
503C      REDEFINE TYPE ENUMERATED
504C      {
505C          {23, "VendorName"}
506C      }
507C  }
508C
509C  VARIABLE pos_value
510C  {
511C      HELP "Position Value: Primary Value representing the Actuator output shaft Position.";
512C      CLASS CORRECTION & DYNAMIC;
513C      LABEL "Position";
514C      HANDLING READ;
515C      TYPE FLOAT
516C      {
517C          DISPLAY_FORMAT ".2f";
518C      }
519C  }
520C
521C  VARIABLE pos_serial_number
522C  {
523C      HELP "Patent Serial Number: Unique identifier for Vendor.";
524C      CLASS DEVICE;
525C      LABEL "Patent s/n";
526C      HANDLING READ & WRITE;
527C      TYPE UNSIGNED_INTEGER(3)
528C      {
529C          DISPLAY_FORMAT "7d";
530C          EDIT_FORMAT "7d";
531C      }
532C  }
```

*FIG. 5C*

```
605A    - <Template TemplateId="103">
606A    - <Screen ScreenIndex="1" ScreenType="Menu" Title="Device Configuration">
607A      - <ParameterDisplay>
608A        <ID>1000</ID>
609A        <Type>Menu</Type>
610A        <Source>Device</Source>
611A        <Label>Online</Label>
612A      - <ParameterDisplay>
613A        <ID>16402</ID>
614A        <Type>Menu</Type>
615A        <Source>Device</Source>
616A        <Label>PatentTest</Label>
617A      - <ParameterDisplay IsDynamic="1">
618A        <ID>16403</ID>
619A        <Type>Menu</Type>
631A        <Source>Device</Source>
632A      - <ParameterDisplay IsHistorized="1" IsComparable="1">
633A        <ID>16387</ID>
634A        <Type>Variable</Type>
635A        <Source>Device</Source>
636A        <ReadOnly>READ_ONLY</ReadOnly>
637A        <Label>Position</Label>
638A        <Help>Position Value: Primary Value representing the Actuator output shaft Position.</Help>
639A        <DisplayFormat>.2f</DisplayFormat>
640A        <Validity>1</Validity>
641A        <ValueType>FLOAT</ValueType>
642A        <MaxSize>4</MaxSize>
643A        </ParameterDisplay>
644A        </ParameterDisplay>
655A      - <ParameterDisplay IsDynamic="1">
656A        <ID>16404</ID>
657A        <Type>Menu</Type>
658A        <Source>Device</Source>
659A      - <ParameterDisplay IsHistorized="1" IsComparable="1">
660A        <ID>16387</ID>
661A        <Type>Variable</Type>
662A        <Source>Device</Source>
663A        <ReadOnly>READ_ONLY</ReadOnly>
664A        <Label>Position</Label>
665A        <Help>Position Value: Primary Value representing the Actuator output shaft Position.</Help>
666A        <DisplayFormat>.2f</DisplayFormat>
667A        <Validity>1</Validity>
668A        <ValueType>FLOAT</ValueType>
669A        <MaxSize>4</MaxSize>
670A        </ParameterDisplay>
```

FIG. 6A

```
655B    </ParameterDisplay>
605B    - <ParameterDisplay IsDynamic="1">
606B      <ID>16405</ID>
607B      <Type>Menu</Type>
608B      <Source>Device</Source>
609B    - <ParameterDisplay IsHistorized="1" IsComparable="1">
610B      <ID>16387</ID>
611B      <Type>Variable</Type>
612B      <Source>Device</Source>
613B      <ReadOnly>READ_ONLY</ReadOnly>
614B      <Label>Position</Label>
615B      <Help>Position Value: Primary Value representing the Actuator output shaft Position.</Help>
616B      <DisplayFormat>.2f</DisplayFormat>
617B      <Validity>1</Validity>
618B      <ValueType>FLOAT</ValueType>
619B      <MaxSize>4</MaxSize>
620B      </ParameterDisplay>
621B    </ParameterDisplay>
631B    - <ParameterDisplay IsDynamic="1">
632B      <ID>16406</ID>
633B      <Type>Menu</Type>
634B      <Source>Device</Source>
635B    - <ParameterDisplay IsHistorized="1" IsComparable="1">
636B      <ID>16387</ID>
637B      <Type>Variable</Type>
638B      <Source>Device</Source>
639B      <ReadOnly>READ_ONLY</ReadOnly>
640B      <Label>Position</Label>
641B      <Help>Position Value: Primary Value representing the Actuator output shaft Position.</Help>
642B      <DisplayFormat>.2f</DisplayFormat>
643B      <Validity>1</Validity>
644B      <ValueType>FLOAT</ValueType>
645B      <MaxSize>4</MaxSize>
646B      </ParameterDisplay>
647B    </ParameterDisplay>
648B    </ParameterDisplay>
```

*FIG. 6B*

```
605C   <ParameterDisplay IsHistorized="1" IsComparable="1">
606C     <ID>16398</ID>
607C     <Type>Variable</Type>
608C     <Source>Device</Source>
609C     <ReadOnly>READ_WRITE</ReadOnly>
610C     <Label>Patent s/n</Label>
611C     <Help>Patent Serial Number: Unique identifier for Vendor.</Help>
612C     <DisplayFormat>7d</DisplayFormat>
613C     <EditFormat>7d</EditFormat>
614C     <Validity>1</Validity>
615C     <ValueType>UNSIGNED_INTEGER</ValueType>
616C     <MaxSize>3</MaxSize>
617C   </ParameterDisplay>
618C   </ParameterDisplay>
619C   </Screen>
620C </Template>
```

*FIG. 6C*

```
705  - <ParameterDisplay>
706    <ID>16403</ID>
707    <Type>Menu</Type>
708    <Source>Device</Source>
709    <Label>MENU 1</Label>
710  - <ParameterDisplay IsHistorized="1" IsComparable="1">
711    <ID>16387</ID>
712    <Type>Variable</Type>
713    <Source>Device</Source>
714    <ReadOnly>READ_ONLY</ReadOnly>
715    <Label>Position</Label>
716    <Help>Position Value: Primary Value representing the Actuator output shaft Position.</Help>
717    <DisplayFormat>.2f</DisplayFormat>
718    <Validity>1</Validity>
719    <ValueType>FLOAT</ValueType>
720    <MaxSize>4</MaxSize>
721    </ParameterDisplay>
722    </ParameterDisplay>
```

*FIG. 7*

MANAGING FIELD DEVICES HAVING DIFFERENT DEVICE DESCRIPTION SPECIFICATIONS IN A PROCESS CONTROL SYSTEM

RELATED APPLICATIONS

The present application is related to and claims priority from the co-pending India Patent Application entitled, "Managing Field Devices Having Different Device Description Specifications in a Process Control System", Ser. No.: 391/CHE/2005, Filed: 7 Apr. 2005, naming the same inventors as in the subject patent application.

The present application is also related to the following co-pending U.S. applications, which are filed on even date herewith, and are incorporated in their entirety herewith:

1. Entitled, "Simplifying Integration of Field Devices Accessible by Different Network Protocols into a Field Device Management System", Ser. No.: 11/145,746, Filed: Jun. 06, 2005, Inventors: MARANAT et al;

2. Entitled, "Presenting Status Information of Field Devices in Process Control Plants", Ser. No.: 11/145,734, Filed: Jun. 06, 2005, Inventors: RAMANATHAN et al;

3. Entitled, "Display of Historical Information Related to Field Devices Used in Process Control Plants", Ser. No.: 11/145,735, Filed: Jun. 06, 2005, Inventors: Surjya Narayana et al

BACKGROUND OF THE INVENTION

1. Field of the Invention

The present invention generally relates to process control systems, and more specifically to a method and apparatus for managing field devices having different device description specifications in a process control system.

2. Related Art

A process control system generally contains several field devices, which are operable to implement a desired control process (e.g., oil refinery, manufacturing operation, etc.). Examples of field devices include valves, positioners and switches, which are controlled to implement the control process.

Field devices may provide status related to the operation of the field device. For example, the status information could indicate temperature, pressure, extent of opening of a valve, light intensity, whether the device is malfunctioning (e.g., output saturated, input open), configuration values, calibration status, etc., of the field devices.

There is a general need to manage field devices provided in a process control system. Management generally refers to tasks such as monitoring and configuration of the devices. Monitoring generally entails retrieving and displaying of the status information such as that noted above. On the other hand configuration generally entails writing data into a variable of the field device.

To facilitate such management of field devices, a device description (DD) is often provided by a vendor associated with a field device.

The device description defines the manner in which commands for a corresponding field device can be issued and the manner in which the response (resulting from issuing of the management commands) is to be interpreted. The DD also contains the information about how the data should be organized and presented to the user.

The definitions in DDs are generally provided according to a DD (language) specification, which specifies the syntax (grammar) and semantics (meaning) for the definitions. Examples of DD (or DDL) specifications include HART DDL Specification 500, FF DDL specification, Profibus DDL specification etc., which are all well known in the relevant arts.

In general, using a DD specification, device description corresponding to various device types can be specified. The device description is often provided in a file, which is generally referred to as a DD file.

A typical task associated with the management of a field device is to read and decode (parsing) a corresponding DD file for extracting the desired information. Due to the differences in aspects such as syntax and semantics of various DD specifications, a prior embodiment implements multiple parsing blocks, with each parsing block being implemented to read and decode a device description file in the corresponding specification.

Due to such multiple parsing blocks, integration of new set of field devices having device description information according to a new DD specification may present additional challenges (implementation overhead and cost). In addition, the corresponding implementations may require additional memory and processing power during operation/run-time, which could be problematic particularly in the case of thin clients.

Accordingly, what is needed is a method and apparatus which overcomes at least some of such disadvantages while managing field devices having different device description specifications in a process control system.

SUMMARY

An aspect of the present invention simplifies management of field devices in a process control plant, in which device descriptions specify a manner in which the field devices are to be managed and the device descriptions are defined according to corresponding specifications. In one embodiment, data is formed representing the device descriptions in a common format. The data in the common format is then examined to process various user actions.

The device descriptions in the common format can be stored in a non-volatile storage such that the corresponding information can be used even after the management system is re-initialized (e.g., turned on and off). In an embodiment, the common format corresponds to extended markup language (XML).

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, which are described below briefly.

FIGS. 5A, 5B and 5C together contain a device description portion used to illustrate the operation of various features of the present invention.

FIGS. 6A, 6B and 6C together contain an XML description of the device description of FIGS. 5A and 5B, illustrating the manner in which device descriptions can be represented using a common format according to an aspect of the present invention.

FIG. 7 illustrates the manner in which a central server provides information on a dynamic menu to be displayed according to an aspect of the present invention.

DETAILED DESCRIPTION

1. Overview

An aspect of the present invention converts device descriptions of field devices defined according to different DD specifications to a common format, and the data in the common format is examined in forming and displaying the user interface to users. In an embodiment, the common format corresponds to XML text.

Such an approach provides several advantages. For example, substantial portion of the task of integration of management of field devices with new device descriptions defined according to new DD specifications into a pre-existing management station, may merely entail generating the new device description in the common format. Similar advantages may be attained when integrating different devices (having corresponding different device descriptions) defined according to the same DD specification.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

2. Example Environment

Figure 1:
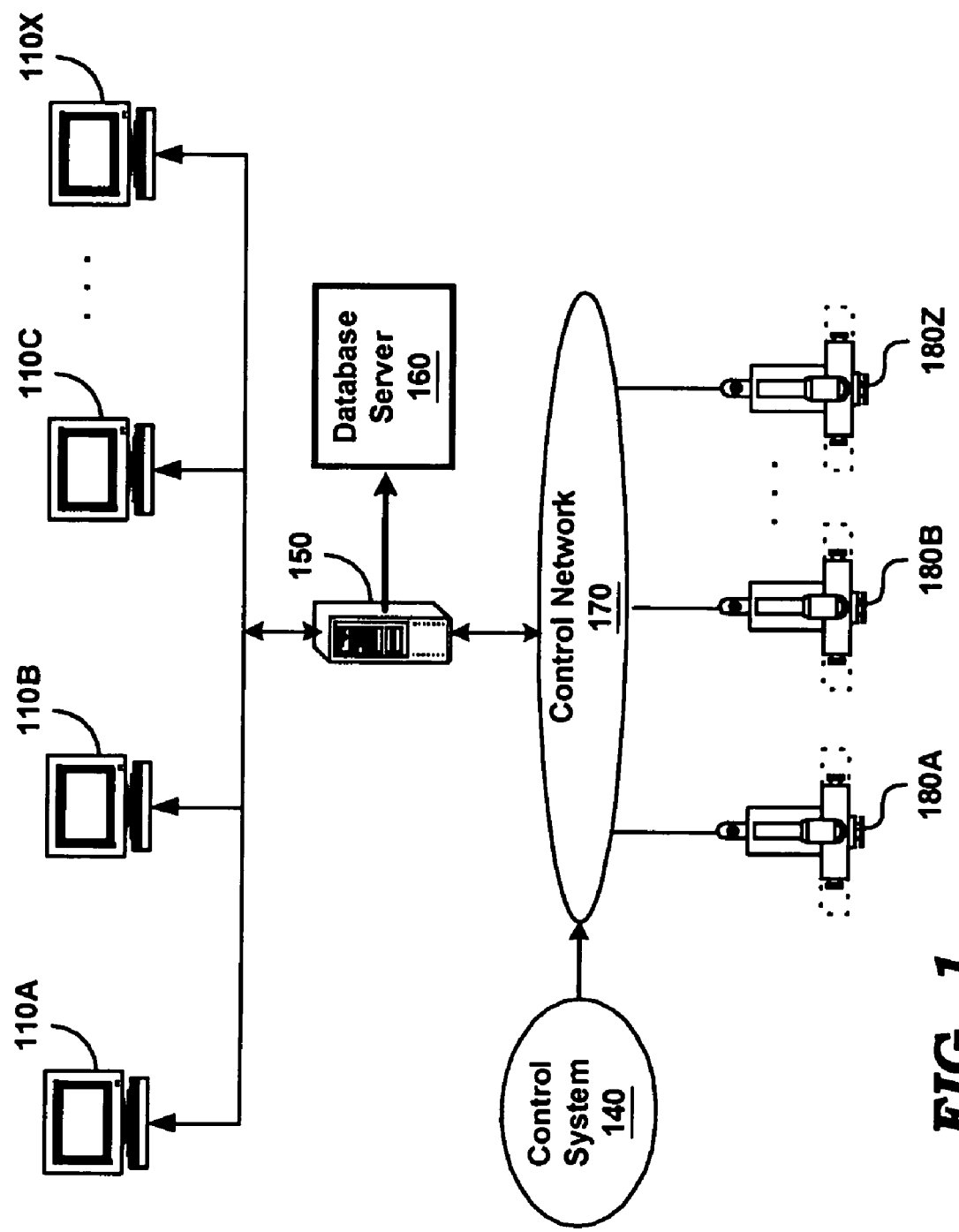
FIG. 1 is a block diagram illustrating an example environment in which various aspect of the present invention can be implemented.

FIG. 1 is a block diagram illustrating the details of an example environment in which several aspects of the present invention can be implemented. The block diagram is shown containing client systems 110A-110X, central server 150, database server 160, control network 170, control system 140, and field devices 180A-180Z. Each block is described below in detail.

Field devices 180A-180Z perform various operations under the control of control system 140 to implement a desired manufacturing process. In addition (or as a part of supporting such a process), each field device may be implemented to support various management commands (for information gathering as well as configuration) received from central server 150. Field devices 180A-180Z receive/transmit relevant data from/to central server 150 on control network 170.

Control network 170 provides connectivity between central server 150, control system 140 and a number of field devices 180A-180Z. Control system 140 issues commands to control the operation of field devices 180A-180Z on control network 170. The field devices are controlled to implement desired control processes (e.g., oil refinery, manufacturing plant). Database server 160 provides a central repository for storing information related to configuration of field devices, status of field devices, maintenance schedules, device description (generated in a common format according to various aspects of the present invention), etc.

Central server 150 receives status information from various field devices 180A through 180Z through control network 170, and makes the information available to users via client systems 110A through 110X. Commands may be issued to the field devices to retrieve the desired information. In an embodiment, information corresponding to only the subscribed information elements (including those covered by subscribed menu portions) is retrieved.

Client systems 110A through 110X provides a user interface using which users may manage field devices 180A through 180Z. Broadly, each client system accesses the device description (DD) information for a corresponding device type to determine the initial display menu to be generated for each selected device. As the user navigates the menu, the next menu portion to display is again determined based on the DD.

In case the DD indicates that the menu portion to be displayed is static (i.e., which does not change), client system 110A displays the corresponding menu (after potentially retrieving any necessary values from the field devices). In case the DD indicates that the menu portion to be displayed is dynamic (i.e., the structure itself depends on the present/then value of a variable(s)), client system 110A subscribes to central server 150 for specific menu of interest (typically what a user has presently selected), and receives the corresponding information from central server 150. The received information may contain the menu to display as well as values of information elements accessible by the tree. The received information is displayed using a suitable user interface.

The manner in which central server 150 and client systems 110A-110X together (monitoring system) facilitate management of field devices in a process control plant according to various aspects of the present invention is described in sections below. Various features of corresponding implementations will be clearer in comparison to a prior system in which at least some features of the present invention are not implemented. Accordingly, the details of such a prior system are described below first.

3. Prior Approach

Figure 2:
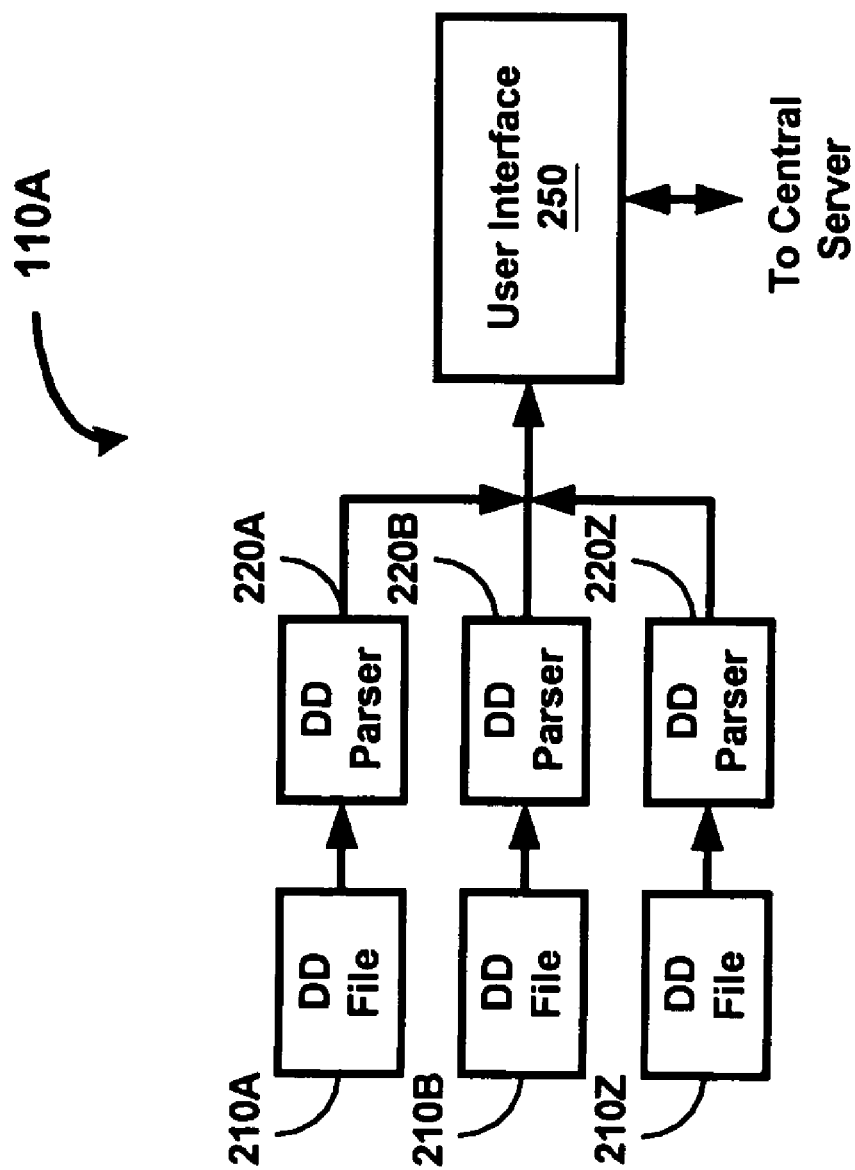
FIG. 2 is a block diagram illustrating the manner in which device description files defined according to different DD specifications are parsed in a prior embodiment.

FIG. 2 is a block diagram illustrating the details of implementation of client system 110A in a prior embodiment. The block diagram is shown containing user interface 250, DD parser 220A-220Z, and device description files (DD file) 210A-210Z. Each block is explained below in further detail.

Each device description file (DD file) 210A-210Z corresponds to a specific type of field device and is provided in a different DD specification. Due to such difference in the DD specifications, separate DD parsers 220A-220Z are shown associated with corresponding device description files 210A-210Z.

Each DD parser 220A-220Z parses and decoders a corresponding device description file 210A-210Z, and extracts the corresponding information. The extracted information (typically, menu representation of various parameters, list of dynamic parameters etc.) is provided to the user interface.

User interface 250 provides users a suitable interface to manage (receive desired information, configuration, etc.) the field devices of interest. In general, user interface 250 receives user action/requests for specific parameter of interest corresponding to a field device, and generates display according to the information provided by the corresponding parsing block, and interfacing with central server 150 if needed (for dynamic menus, as noted above).

One problem with the above approach is that, due to separate parsing blocks (DD parser) for each type of field devices, integration of new device type may require unacceptably high cost and/or time. Migrating the implementation on newer OS/platform would again require high cost. Various aspects of the present invention overcome some of such problems as described below in further detail.

4. Inventive Approach

Figure 3:
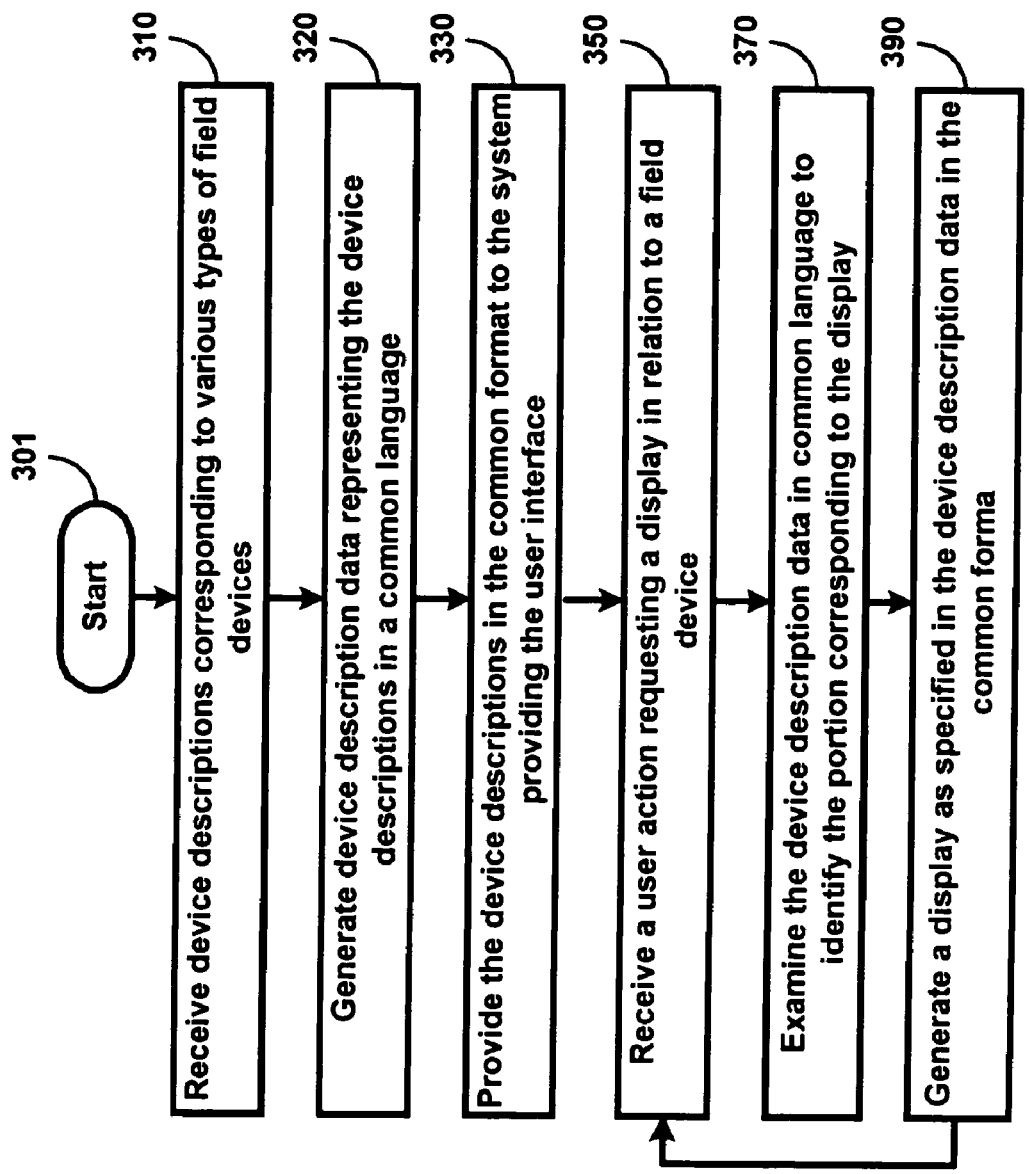
FIG. 3 is a flowchart illustrating the manner in which user interface is provided according to another aspect of the present invention.

FIG. 3 is a flowchart illustrating the manner in which user interface is provided according to various aspects of the present invention. Some of the steps of the flowchart are described as being implemented within client system 110A of FIG. 1 merely for illustration. However, the approaches can be implemented in other systems and environments as well, as will be apparent to one skilled in the relevant arts by reading the disclosure provided herein. The flow chart begins in step 301 and control immediately passes to step 310.

In step 310, a digital processing system receives the device description files corresponding to various types of field devices. The system may receive device description file on a computer readable medium (such as floppy disk, laser disk) through corresponding interfaces such as CD drive, floppy drive, LAN etc. The received device description files generally contain description of corresponding field device types in different DD specifications as noted above.

In step 320, the system generates device description data representing the device descriptions in a common format. Such generation generally depends on the syntax/semantics of the DD specification using which the source device description is defined, and the common format in which the description is sought to be generated. Thus, the device description data (DD data) in the common format may be generated by extracting the device description from each source device description file (according to the instruction and guidelines) and arranging the extracted device description information in the common format.

In step 330, the device descriptions in the common format are provided to client system 110A providing the user interface. The device descriptions may be provided again on a computer readable medium or over network connections (LAN).

In step 350, client system 110A receives a user action requesting a display in relation to a field device of interest. Client system 110A may enable users to provide requests for various parameters of interest corresponding to a field device, and in response, converts the request into data representing information such as field device ID (selected field device), requested status information etc, for the selected field device.

In step 370, client system 110A examines the device description data in common format (for the selected field device) to identify the portion corresponding to the requested display. Client system 110A may identify DD data corresponding to field device type of interest based on the unique ID (obtained by following fields. Manufacturer ID, Device type, Dveice revision and DD revision), and accesses the corresponding DD data. The accessed DD data is decoded according to the common format and the required device description information for the selected field device is extracted.

In step 390 clients system generates a display as specified in device description in the common format. As noted above, for display portions containing dynamic menus, central server 150 may be contacted for the present value of the variable determining the structure of the dynamic menu or for the structure of the dynamic menu itself. Control then transfers to step 350 to process the next user action.

Due to the use of the common format, integration of the management of new field device types may be simplified, as also noted in sections above. Also the supporting web based client or supporting user interface on different OS/Platform will be simpler. An example software architecture following from the approach of above is described briefly below.

5. Example Software Architecture

Figure 4:
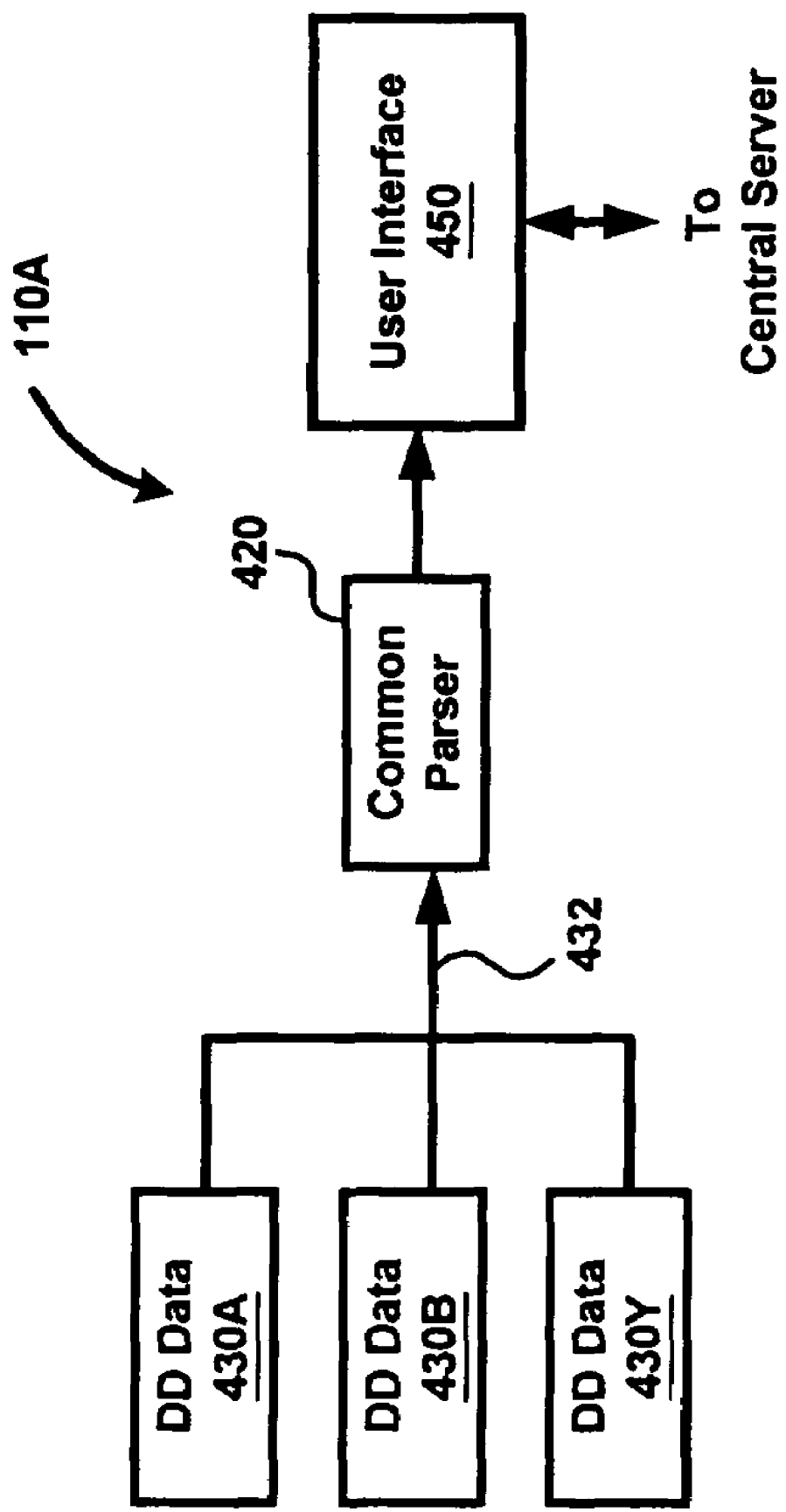
FIG. 4 is a block diagram of an example software architecture which provides user interface according to an aspect of the present invention.

FIG. 4 is a block diagram illustrating the software architecture of a client system according to various aspects of present invention. The block diagram is shown containing user interface 450, common parser 420, and DD data 430A-430Y. Each block is described below in further detail.

DD data 430A-430Y represents the device description data (containing device description information) in a common format generated from the corresponding device description files 210A-210Z. DD data 430A-430Y is generated according to steps 310 and 320 of FIG. 3. Path 432 logically represents the single common format interface to the different DD data 430A-430Y. DD data may be stored in database 160 (non-volatile medium or secondary storage) in the form of files.

Common parser 420 is designed to parse all of the DD data 430A-430Y, and extract the necessary information. The extracted information (typically, menu representation of various parameters, list of dynamic parameters etc,) is provided to the user interface 450. Due to the common format of DD data 430A-430Y, a single common parser 420 reads and extracts device description information corresponding to any field device type. The information decoded may be stored in appropriate data structures (e.g., objects supported in a random access memory (RAM), not shown).

User interface 450 examines the information decoded by common parser 420 to determine the manner in which to handle each user action. In the case of displaying static menus, user interface 450 may generate display of the corresponding menu structure using the information received from the common parser.

In the case of displaying dynamic menus (which is determined based on the received decoded information), user interface 450 may subscribe to central server 150 for the dynamic menu. In one embodiment, the dynamic menu to be displayed is represented in the same common format used to represent DD data 430A-430Y, and the common format represents extended markup language (XML).

The description is continued with respect to the manner in which an example portion of a DD file is represented by DD data in XML common format, and the manner in which the DD data is used to generate the corresponding displays. First, the example portion of the DD file is described.

6. Device Description

FIGS. 5A, 5B and 5C together represent a sample device description (DD) portion (related to user interface portion) illustrating the manner in which menus are represented for providing display of various parameters. It should be understood that the device description has been broken into three Figures merely to accommodate respective lines in each Figure, however, lines with numbers ending with B in FIG. 5B follow the lines with numbers ending with A in FIG. 5A, and numbers ending with C in FIG. 5C follow the lines with numbers ending with B in FIG. 5B.

In general, a vendor provides the device description in a file (DD file), which needs to be parsed consistent with the (syntax/semantics of) corresponding DD specification. Often, the files are provided in binary representation. However, for understandability, the corresponding source is shown in these three Figures. The content of FIGS. 5A, 5B and 5C represents a portion of device description corresponding to a menu of a DD written as per HART DDL specification.

Lines 501A-516A represent a description for an information element of type menu (i.e., defining a sub-tree portion), with an identifier of root_menu. The label is set to Online in line 508A. Line 509A defines the start point of the menu items list, and two items are shown as patent and pos_serial_number in lines 511A and 512A respectively. The definitions of items patent and pos_serial_number is provided starting at lines 518A and 533C, as described below in further detail.

Lines 518A-528A provide description for information element Patent. Line 518A defines the element as a menu, and label for the patent menu is provided as "patent Test" at line 520. Description at lines 521-528 lists four items under menu "Patent Test" having identifiers menu_test1, menu_test2, menu_test3 and menu_test4, which are respectively defined starting at line numbers 530A, 501B, 518B, and 535B, as described below.

Lines 530A-546A provides description for the item menu_test1. Line 530A identifies the item as being of menu type. Lines 532A-540A define the label value depending on the value of a variable pos_serial_number. Line 535A indicates that the label equals MENU1 if pos_serial_number equals 1, and line 539A indicates that the label equals "Menu not available" otherwise. Lines 542A-546A indicate that an item identified by an information element with identifier pos_value (defined starting at 509C) is provided as a list associated with the displayed label.

Continuing with respect to FIG. 5B, lines 501B-516B, 518B-533B, and 535B-550B respectively provide description for information elements having identifiers menu_test2, menu_test3, and menu_test4 similar to lines 530-446. The description of each information element provided is similar to the menu_test1. The line 504B, line 521B and line 538B indicates labels for menu_test2, menu_test3, and menu_test4 depend on the values of pos_serial_number.

From the above, it may be appreciated that pos_serial_number represents a variable, whose value determines the menu/tree structure. In addition, the value associated with a menu item is defined by variable pos_value. The information elements corresponding to the two variables are described below with reference to FIG. 5C.

Continuing with reference to FIG. 5C, lines 501C-507C describes an information element as being a variable with identifier private_label_distributor, having enumerated static values equaling 23 and "vendor". Lines 509C-517C provide the description of variable pos_value. Description provides a label "Position" (line 513C), a display format of 2f (line 517C) and the field device (line 514C) for displaying.

Lines 533C-544C provides the description of variable pos_serial_number. Line 538C indicates the corresponding values are to be read from the device and that the value can be written, line 539C indicates that the values are of unsigned integer type, line 541C indicates that the variable is to be displayed with a display format of "7d" (seven decimal digits), line 542C indicates that a user interface should allow the value to be edited/provided in the "7d" display format, and display according to description provided for label and display format on line 525C and 529C respectively.

As noted above, according to an aspect of present invention, the device descriptions of different DD specifications are represented in XML format (single common format). The manner in which the content of FIGS. 5A-5C is represented according to an example approach is described below with respect to FIGS. 6A-6C.

7. Device Description in Common Format

FIGS. 6A, 6B and 6C together illustrate the manner in which the device description file of FIGS. 5A, 5B and 5C is represented in XML in an embodiment of the present invention. It should be understood that the device description has been broken into three Figures merely to accommodate respective lines in each Figure, however, lines with numbers ending with B in FIG. 6B follow the lines with numbers ending with A in FIG. 6A, and numbers ending with C in FIG. 6C follow the lines with numbers ending with B in FIG. 6B.

To appreciate the manner in which FIGS. 5A, 5B, and 5C is represented in XML, it is helpful to first note that each element of FIGS. 5A-5C is assigned a corresponding unique identifier (ID) (when a tokeniser converts the DD source to corresponding binary representation, which is distributed with client systems 110A-110X), and the assigned identifiers are used in the XML representation. For illustration, it is assumed that identifiers of 1000, 16403, 16404, 16406 and 16407 are respectively assigned for information elements root_menu, menu_test1, menu_test2, menu_test3, and menu_test4. Similarly, IDs of 16387 and 16398 are assigned to variables pos_value and pos_serial_number (seen in FIGS. 5A-5C).

Continuing with combined reference to FIGS. 6A-6C, the tag 'template' starting in line 605A and ending in line 620C captures the device description file of FIGS. 5A, 5B, and 5C. Tag 'screen' starting in line 606A and ending in line 619C identifies the description information as display information. Tag 'Parameter Display' starting in line 607A and ending in line 618C captures menu structure for displaying the information starting with root_menu identified by ID 1000 inline 608A.

Lines 609A-611A capture the information corresponding to root_menu and corresponding labels provided on line 503A-508A. Lines 613A-616A capture information provided in lines 511A and 520A (one of the elements of the root_menu patent and the corresponding label).

The tag contents represented by lines 617A-644A, 656A-670A, 605B-621B, and 631B-647B respectively captures the information corresponding to menu_test1, menu_test2, menu_test3, and menu_test4 as represented in line 530A-546A, 501B-517B, 518B-533B and 535B-550B along with details of information corresponding to variable pos_value contained in line 509C-519C. Detailed description of only the tags represented by lines 617A-644A is provided below for conciseness.

Line 619A is shown indicating the element menu_test1 (16403) as menu. Line 617A indicates that the element (16403) on line 618A is dynamic (corresponding to line 533A). Accordingly the label corresponding to ID 16403 is not captured in XML representation (and central server 150 is relied upon to provide that information). Further, element pos_value on line 544A contained in menu_test1 is captured on line 633A with ID 16387. The information pertaining to the variable pos-value provided on lines 411C-517C is captured on lines 634A-642A.

ID 16398 on line 606C corresponds to element pos_serial_number and information corresponding to variable pos_serial_number provided on lines 522C-532C is captured on line 607C-616C. ID 16398 is included (contained with in tags of root_menu) as one of the element contained within root_menu (ID 1000).

It should be appreciated that various approaches (e.g., software utilities) to generate the content of FIGS. 6A, 6B and 6C from the content of FIGS. 5A, 5B and 5C will be apparent to one skilled in the relevant arts by reading the disclosure provided herein. In general, the corresponding conversion requires an understanding of the syntax/semantics of the DD specification using which the content of FIGS. 5A-5C is defined, and the desired format of FIG. 6A-6C, as also noted above.

Client system 180 generates display of requested menu portion according to the device description information provided in common format. An example embodiment in which a client system generates display by parsing DD data provided in a common format is described below.

8. Generating Display According to Device Description in Common Format

In one embodiment, client system 110A examines the DD data provided in a common format (i.e., content of FIGS. 6A-6C in the illustrative example) to determine the manner in which user actions are to be processed. In case the display to be generated corresponds to a dynamic menu, client system 110A communicates with central server for obtaining the dynamic menu portion. Client system 110A generates the requested display by integrating the received dynamic menu portion in common format with DD data. Description is continued below assuming a user selects a display portion corresponding to ID 16402 (Patent Test also shown below in FIG. 8), Client system 110A parses the DD data provided in a XML common format shown in FIGS. 6A-6C. Client system 110A identifies dynamic menu containing elements 16403, 16404, 16405 and 16406 within the 'Parameter Display' tag (corresponding to ID 16402) starting in line 612A and ending in line 648B. Lines 617A, 655A, 605B, and 631B, respectively indicate that elements 16403, 16404, 16405 and 16406 are dynamic. Hence client system 110A subscribes/requests for present display information corresponding to the dynamic menu by sending identifiers 16403, 16404, 16405 and 16406 to central server 150.

Central server 150 examines its copy of the DD (either in the common format or according to the corresponding DD specification) and generates data representing the display of the requested dynamic menu. Any necessary present information (to construct the menu portion and corresponding values) may be obtained from the corresponding field devices by issuing appropriate management commands.

According to an aspect of the present invention, central server 150 sends the dynamic menu data corresponding to elements 16403, 16404, 16405 and 16406 to client system 110A in the common format used to represent the DD data. FIG. 7 illustrate an example dynamic menu data for element 16403 received by client system from the central server in common format as described below in further detail.

With respect to FIG. 7, line 705 indicates the element 16403 as static and line 707 indicates the element is of type menu. Line 709 provides present label for displaying as 'MENU1'. Line 711 indicates element 16387 contained in menu 'MENU1' and details of displaying the element 16387 is captured in lines 712-720. Line 715, 717 and 719 respectively provide label as 'position', display format as '2f', and type as 'float'.

Continuing with respect to generating display from the DD data in the common format, client system 110A replaces (temporarily/logically) the appropriate portion in the DD data with the content received from the central server (in common format). For example lines 617A-644A (in FIG. 6A) corresponding to elements 16403 is replaced with lines 705-722 of FIG. 7 received from central server 150. Accordingly the dynamic identifier on line 617A is replaced by a static identifier of line 705. A label 'MENU1' for the menu element 16403 is provided on line 709 which otherwise was not present in FIG. 6A. As a result the content of the DD data now represents the complete menu structure for present time instant.

Thus, since the received data is in the common format, the received data can be easily inserted into the DD data noted above. In addition, it should be appreciated that the common parser can be used to while generating display from the data received from central server 150, thereby further simplifying the implementation of the user interface. Display corresponding to the menu is then rendered, as illustrated below with respect to FIG. 8.

Figure 8:
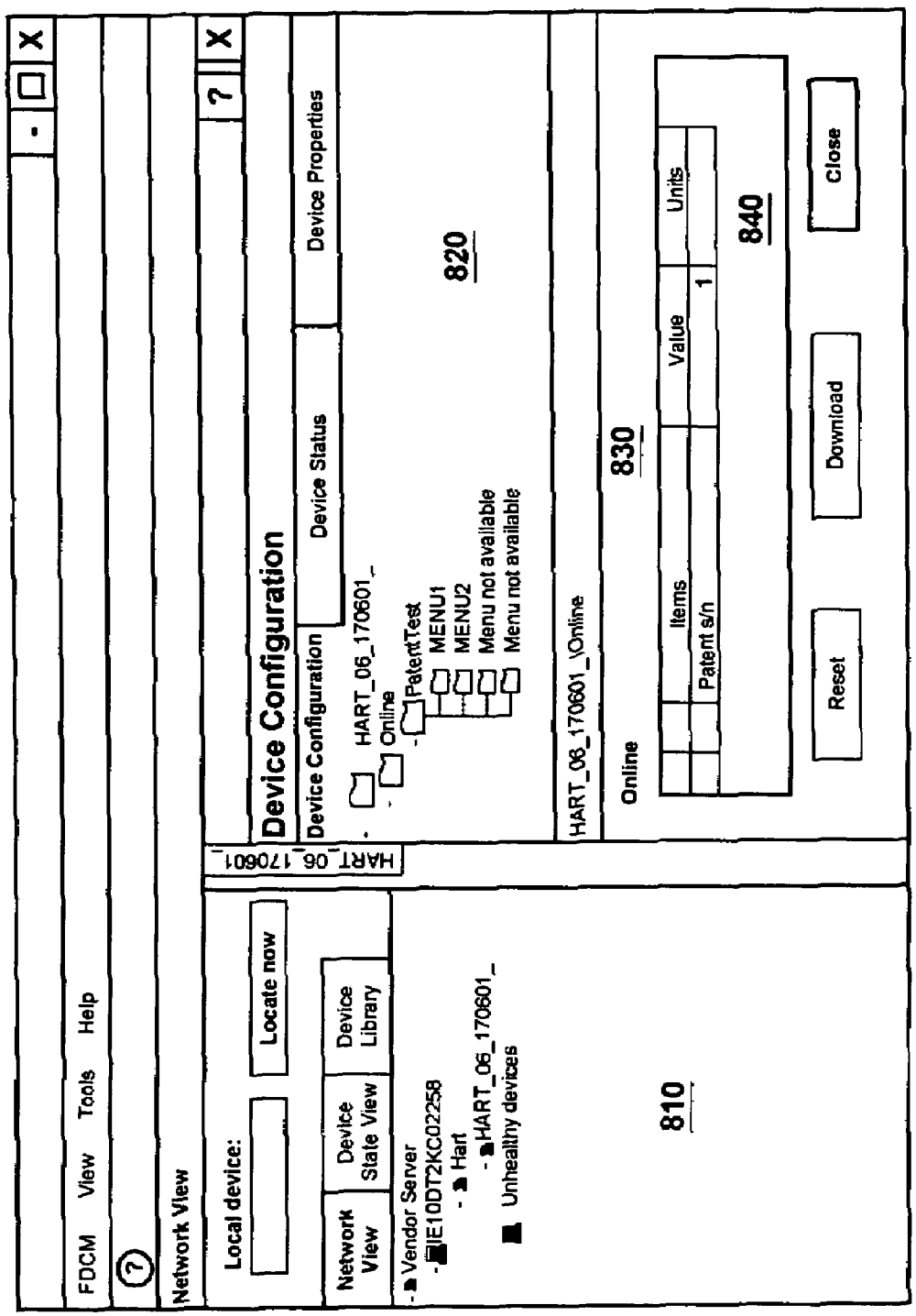
FIG. 8 contains a display screen illustrating the dynamic menu displayed from the device description of the common format in an embodiment of the present invention.

FIG. 8 illustrates an example display generated by the client system after replacing the various content of DD data (as noted above) with the data received from the central server 150. The display is shown containing four portions 810, 820, 830 and 840. Description is provided for generation of display portion 820 and 830 of FIG. 8 with reference to FIGS. 6A-6C and FIG. 7 for conciseness.

Line 606A indicating screen title as 'Device Configuration' causes client system 110A to generate a title 'Device Configuration' in display portion 820. ID 1000 of line 608A, type indicator menu on line 609 and label 'Online' indicator on line 611A causes client system to provide a menu with label 'Online' as shown. Lines 613A and 605C represents two elements element with ID 16402 and 16398 within menu 'Online'. Lines 614A-616A provide details for element 16402 as menu with 'Patent test' as label and lines 607C-616C provide description for element 16398 as variable with label 'patent s/n' for providing the display. Accordingly a submenu 'Patent test' within menu 'Online' is generated by the client system. Portion 830 provides display of element 16398 as 'patent s/n'.

Display corresponding to four elements 16403, 16404, 16405 and 16406 contained within submenu 'Patent test' is provided according to the information received from central server 150. The first sub element 16403 of sub menu 'Patent test' is displayed according th data described in FIG. 7. Accordingly, a menu with label 'MENU1' is displayed in portion 820. Similarly, assuming a label 'MENU2', 'Menu not available' and 'Menu not available' is received with respect to elements 16404, 16405 and 16406, display is provided accordingly below the sub menu 'Patent test'.

Thus, using the DD data in the common format, a suitable user interface can be generated according to various aspects of the present invention. The features thus provided help in separating UI rendering work from DD interpretation and device communication. Since the common format is platform independent the data can be used on different OS to show the configuration screens. This also helps in supporting thick client and thin client with the same server.

Also, the features described above can be implemented in various embodiments. The description is continued with respect to an embodiment in which various features of the present invention are operative by execution of appropriate software instructions.

9. Software Implementation

Figure 9:
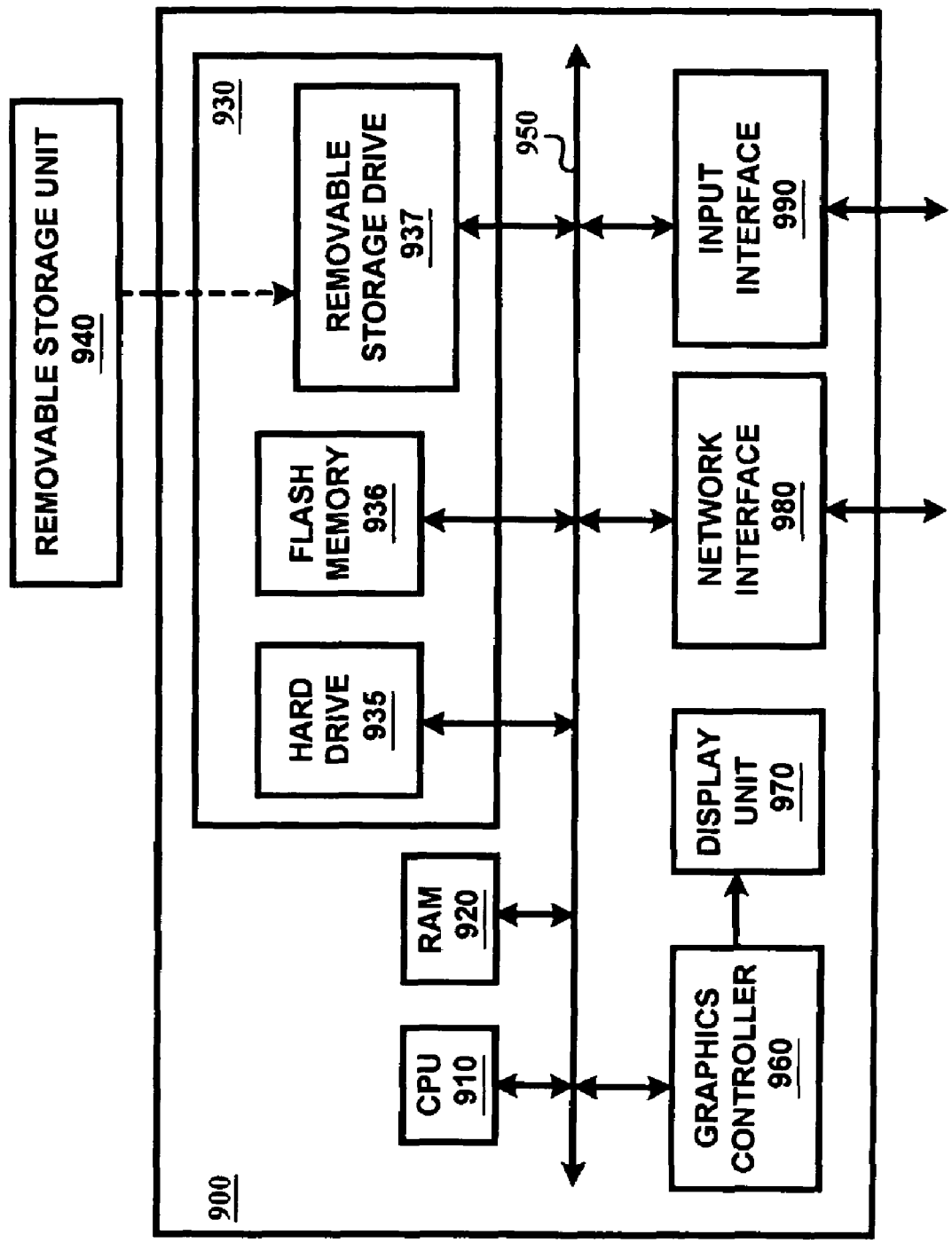
FIG. 9 is a block diagram illustrating the details of an embodiment in which various aspects of the present invention are operative by execution of software instructions in an embodiment of the present invention.

FIG. 9 is a block diagram illustrating the details of digital processing system 900 implemented substantially in the form of software in an embodiment of the present invention. System 900 may correspond to one of client systems 110A-11X and central server 150. System 900 may contain one or more processors such as central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general purpose processing unit. RAM 920 may receive instructions from secondary memory 930 using communication path 950.

Graphics controller 960 generates display signals (e.g., in RGB format) to display unit 570 based on data/instructions received from CPU 910. Display unit 970 contains a display screen to display the images defined by the display signals. Input interface 990 may correspond to a key_board and/or mouse. Display unit 970 and input interface 990 enable a user to interact with system 900 and manage the field devices.

Network interface 980 provides the physical, electrical and protocol interfaces needed for each system. In the case of client systems 110A-110X, a network connection to communicate on a local area network (to which central server 150 is also connected) using protocols such as TCP/IP may be sufficient. On the other hand, in case of central server 150, in addition to such a network connection, a control network connection to interface with control network 130 may be necessary.

Secondary memory 930 may contain hard drive 935, flash memory 936 and removable storage drive 937. Secondary memory 930 may store the data (e.g., DD data provided according to the common format, DD files, etc.) and software instructions, which enable system 900 to provide several features in accordance with the present invention. Some or all of the data and instructions may be provided on removable storage unit 940, and the data and instructions may be read and provided by removable storage drive 937 to CPU 910. Floppy drive, magnetic tape drive, CD_ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data.

In this document, the term "computer program product" is used to generally refer to removable storage unit 940 or hard disk installed in hard drive 935. These computer program products are means for providing software to system 900. CPU 910 may retrieve the software instructions, and execute the instructions to provide various features of the present invention described above.

10. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of managing a plurality of field devices from a client system in a process control plant, each of a first plurality of device descriptions specifying a manner in which a corresponding one of said plurality of field devices is to be managed, said first plurality of device descriptions being defined according to a corresponding different plurality of specifications, said method comprising:

forming a second plurality of device descriptions from said first plurality of device descriptions, all of said second plurality of device descriptions being in a common format and also specifying said manner in which said plurality of field devices are to be managed, wherein said first plurality of device descriptions are received by said forming from a corresponding first plurality of files and said second plurality of device descriptions are stored by said forming in a corresponding second plurality of files on a non-volatile storage;

receiving in said client system data representing a user action associated with a first field device contained in said plurality of field devices;

identifying in said client system a first device description corresponding to said first field device among said second plurality of device descriptions, wherein said first device description is contained in a first file in said common format, wherein said first file is contained in said second plurality of files; and examining in said client system said first device description in said first file in said common format to determine the manner in which to process data representing said user action, wherein a common parser is used by said client system in said examining due to the use of said common format, wherein said examining is performed after said receiving, and wherein said forming is performed external to said client system.

2. The method of claim 1, wherein said common format comprises extended markup language (XML).

3. The method of claim 1, wherein a client system provides an user interface to manage said plurality of field devices, said identifying and said examining being implemented in said client system.

4. The method of claim 3, wherein said user action comprises a request for display in said client system of a status information of said first field device, wherein said examining comprises parsing said first device description in said common format to determine whether a menu portion for displaying said status information is dynamic depending on a present value of a variable, said client system subscribing to a server system for said status information if said menu portion is determined to be dynamic.

5. The method of claim 4, wherein said client system receives from said server system, data representing said menu portion in said common format.

6. The method of claim 4, wherein said first device description contains a unique identifier identifying each information element contained in a corresponding one of said second plurality of device descriptions, wherein said unique identifier is sent by said client system to said server system to subscribe for said status information, wherein said examining is used to determine said unique identifier.

7. The method of claim 5, further comprising:
replacing said menu portion with said data representing said menu portion received from said server system; and
using said common parser to perform said parsing of said data while rendering said user interface.

8. The method of claim 1, whereby implementation of said examining is simplified due to use of said common parser since parser for each of said plurality of specifications need not be implemented to support said examining.

9. The method of claim 1, wherein said identifying is also performed after said receiving.

10. A computer readable medium carrying one or more sequences of instructions for causing a client system to manage a plurality of field devices in a process control plant, wherein each of a first plurality of device descriptions specifying a manner in which a corresponding one of said plurality of field devices is to be managed, said first plurality of device descriptions being defined according to a corresponding different plurality of specifications, wherein execution of said one or more sequences of instructions by one or more processors contained in said system causes said one or more processors to perform the actions of:
receiving data representing a user action associated with a first field device contained in said plurality of field devices;
identifying a first file containing a first device description corresponding to said first field device in a common format, wherein said first device description is contained in a second plurality of device descriptions in said common format and said first file is contained in a second plurality of files in said common format,
wherein said second plurality of device descriptions are formed from said first plurality of device descriptions and are stored in corresponding ones of said second plurality of files, all of said second plurality of device descriptions being in said common format and also specifying said manner in which said plurality of field devices are to be managed; and
examining said first device description in said common format to determine the manner in which to process data representing said user action, wherein a common parser is used by said examining due to the use of said common format,
wherein said examining is performed after said receiving.

11. The computer readable medium of claim 10, wherein said common format comprises extended markup language (XML).

12. The computer readable medium of claim 10, wherein a client system provides an user interface to manage said plurality of field devices, said identifying and said examining being implemented in said client system.

13. The computer readable medium of claim 12, wherein said user action comprises a request for display in said client system of a status information of said first field device, wherein said examining comprises parsing said first device description in said common format to determine whether a menu portion for displaying said status information is dynamic depending on a present value of a variable, said client system subscribing to a server system for said status information if said menu portion is determined to be dynamic.

14. The computer readable medium of claim 13, wherein said client system receives from said server system data representing said menu portion in said common format.

15. The computer readable medium of claim 14, wherein said first device description contains a unique identifier identifying each information element contained in a corresponding one of said second plurality of device descriptions, wherein said unique identifier is sent by said client system to said server system to subscribe for said status information, wherein said examining is used to determine said unique identifier.

16. The computer readable medium of claim 14, further comprising:
replacing said menu portion with said data representing said menu portion received from said server system; and
using said common parser to perform said parsing of said data while rendering said user interface.

17. The computer readable medium of claim 10, wherein said identifying is also performed after said receiving.

18. An apparatus for managing a plurality of field devices in a process control plant, each of a first plurality of device descriptions specifying a manner in which a corresponding one of said plurality of field devices is to be managed, said first plurality of device descriptions being defined according to a corresponding different plurality of specifications, said apparatus comprising:
means for receiving data representing a user action associated with a first field device contained in said plurality of field devices;
means for identifying a first file containing a first device description corresponding to said first field device in a common format, wherein said first device description is contained in a second plurality of device descriptions in said common format and said first file is contained in a second plurality of files in said common format,
wherein said second plurality of device descriptions are formed from said first plurality of device descriptions and are stored in corresponding ones of said second plurality of files, all of said second plurality of device descriptions being in said common format and also specifying said manner in which said plurality of field devices are to be managed; and
means for examining said first device description in said common format to determine the manner in which to process data representing said user action, wherein a common parser is used by said examining due to the use of said common format,
wherein said examining is performed after said receiving.

* * * * *